United States Patent [19]

Green et al.

[11] 4,059,731
[45] Nov. 22, 1977

[54] SIGNALING STORAGE IN DIGITAL CHANNEL BANKS

[75] Inventors: John Henry Green, Georgetown, Mass.; Joseph Elide Landry, Atkinson, N.H.

[73] Assignee: Bell Telephone Laboratories, Incorporated, Murray Hill, N.J.

[21] Appl. No.: 764,571

[22] Filed: Feb. 1, 1977

[51] Int. Cl.² ............................................. H04J 3/12
[52] U.S. Cl. ........................ 179/15 BY; 179/15 BF; 340/146.1 R
[58] Field of Search ................ 179/15 BF, 15 BY; 340/146.1 R; 235/153 R

[56] References Cited

U.S. PATENT DOCUMENTS

| | | | |
|---|---|---|---|
| 3,378,641 | 4/1968 | Varsos | 179/15.55 |
| 3,386,081 | 5/1968 | Varsos | 340/172 |
| 3,676,210 | 10/1972 | Peterson | 179/15 BF |
| 3,970,799 | 7/1976 | Colton | 179/15 BY |

OTHER PUBLICATIONS

Bell Laboratories Record, Aug. 1972, "The D3 Channel Bank" by W.B. Gaunt et al., pp. 229–233.
Bell System Technical Journal, Oct. 1972, "B2 Channel Bank: Per–Channel Equipment" by C.L. Maddox et al., pp. 1659–1673.
Bell System Technical Journal, Oct. 1972, "D2 Channel Bank: System Aspects" by H.H. Henning et al., pp. 1641–1657.

*Primary Examiner*—David L. Stewart
*Attorney, Agent, or Firm*—John K. Mullarney

[57] ABSTRACT

In a digital channel bank, the binary signaling states (on-hook, off-hook) are updated periodically for each channel. Some number ($n \geq 2$) of the most recent of these samples are stored at the receive end of the digital system for each message channel. Under normal working conditions the output (to the switching machine) is directly influenced by the incoming real-time samples. However, when a carrier disturbance (i.e., out-of-frame condition) is detected, the updating process is stopped and the output is controlled by the older stored bits. That is, instead of sending the real-time signaling information of each channel to the switch, the signaling bits that were received and stored during a previous frame (e.g., 12 or more frames earlier) are now coupled to the switch. This assures a high probability that the proper signaling state is presented to the switch during short carrier disturbances.

6 Claims, 5 Drawing Figures

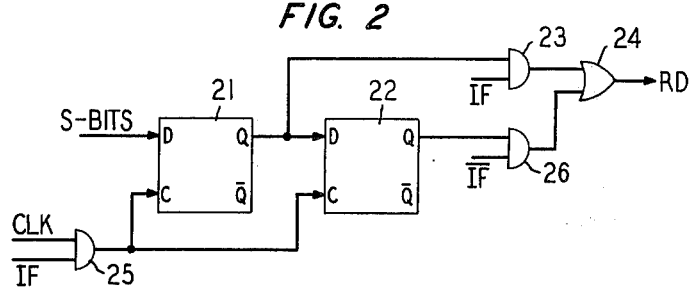
FIG. 2
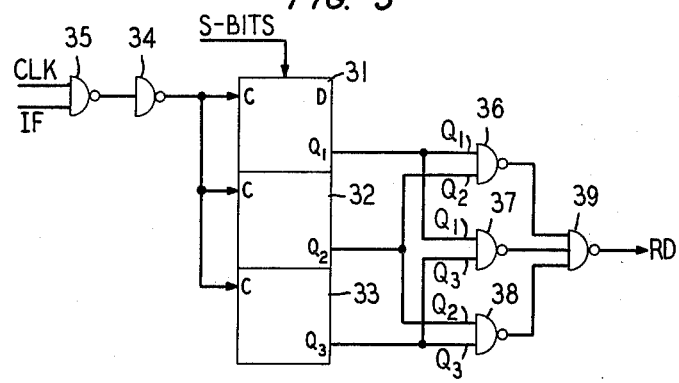
FIG. 3
FIG. 4
| Q's | RD |
|---|---|
| ALL "0" | 0 |
| TWO "0" AND ONE "1" | 0 |
| ONE "0" AND TWO "1" | 1 |
| ALL "1" | 1 |
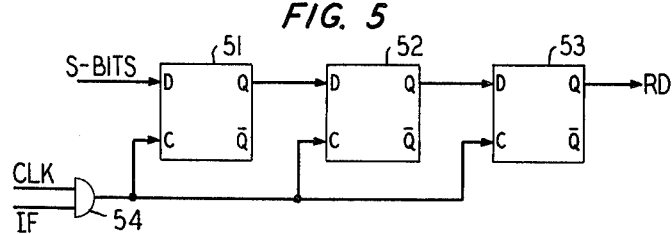
FIG. 5

SIGNALING STORAGE IN DIGITAL CHANNEL BANKS

BACKGROUND OF THE INVENTION

This invention relates to digital communications systems and, more particularly, to the processing of signaling information (e.g., on-hook, off-hook) that is passed between central offices via digital channel banks.

A digital channel bank is used as a voice terminal for the digital transmission network — i.e., it typically interfaces a conventional switching machine and a digital transmission facility. It samples the speech amplitude and the signaling state of each of a plurality (e.g., 24) of trunks (voice channels) in rotation, multiplexes the information on a time division basis, and transmits it directly to a digital line (T1) or, via one or more stages of digital multiplexing, to a higher speed digital line. At the receiving end, another channel bank restores the original transmission amplitudes and signaling states.

Stated somewhat differently, the role of digital channel banks is to reproduce the voice and signaling information so that from the point of view of the office circuits, they are interconnected as though by metallic wires. Signaling continuity is maintained as follows. The incoming signaling state of each trunk is detected at each channel unit of a digital channel bank. Periodically (e.g., every 1.5 milliseconds) a digital line bit carries this detected information to the receive terminal or channel bank, and thence to the receive channel unit thereof. As each incoming signaling bit is detected, it is held (e.g., in a flip-flop store) until the next bit comes along. Relays are operated by the output of this process to reproduce, at the receive office, the detected signaling states.

The foregoing is admittedly a very sketchy and generalized description of the purpose and function of digital channel banks. In the exchange plant, the D3 Channel Bank is in wide use today and is described in greater detail in the article "The D3 Channel Bank" by W. B. Gaunt and J. B. Evans, Jr., *Bell Laboratories Record*, August 1972, pages 229-233. For intertoll (long-distance) use, the D2 Channel Bank has been in use since 1970; it is described in the articles "D2 Channel Bank: System Aspects" by H. H. Henning and J. W. Pan, *The Bell System Technical Journal*, October 1972, pages 1641-1657, and "D2 Channel Bank: Per-Channel Equipment" by C.L. Maddox and D. K. Thovson, *The Bell System Technical Journal*, October 1972, pages 1659-1673. There are additional articles in this October 1972 issue dealing with the D2 Channel Bank, but these are, for present purposes, merely cumulative.

When a digital carrier failure (i.e., loss of frame) occurs, the involved trunks are busied out by the associated trunk processing or carrier group alarm circuits in the digital channel bank. Historically, the time delay between fault detection and trunk processing committal has been in the order of several hundred milliseconds; the modern objective for this interval is 2.50 seconds. The longer interval is an attempt to reduce the trunk processing operations on short disruptions. Trunk processing, of course, takes the digital carrier out of service. A dilemma arises in trying to deal with the trunk signaling states in the interval between fault detection and trunk processing. The ideal solution would be to immediately freeze all signaling states at the channel unit signaling receivers when a fault occurs, and hold these states until the system restores or until the 2.50 second elapses and the trunks are processed. With this ideal situation, established connections are not broken and false sender seizures do not occur. However, a difficulty arises from the fact that a fault is not detected at the instant it occurs and by the time the fault is detected, false signaling information has likely been introduced into some of the channel unit signaling receivers.

SUMMARY OF THE INVENTION

A primary object of the present invention is to maintain a high probability of presenting the proper signaling state to a central office during the interval between fault detection and system restoral or trunk processing.

A related object of the invention is to improve signaling reliability in a cmmunications system in as simple and inexpensive a manner as possible.

Another object of the invention is to substantially eliminate the possibility of transmitting false signaling information due to transmission line "hits" in a digital transmission system.

These objects are attained in accordance with the present invention by storing (e.g., flip-flop store) not only the most recent signaling bit for each message channel, but also one or more of the previous signaling bits for each of the message channels. When a carrier disturbance (i.e., out-of-frame condition) is detected, the signal bit updating process is stopped (e.g., new signaling samples are not clocked into the channel units) and the previous or "stored" signaling states are presented to the trunks. There is a high probability (in order of 0.97 or higher) that a stored signaling bit ($n \geq 2$) was not permuted to the improper state between failure occurrence and failure detection.

In accordance with a preferred embodiment of the present invention the binary signaling states (on-hook, off-hook) are updated periodically for each channel. Some number ($n \geq 2$) of the most recent of these samples are stored (in flip-flop stores) at the receiver end of the system for each message channel. Under normal working conditions (i.e., the in-frame condition) the output to the switching machine is directly influenced by the incoming samples — i.e., the real-time signaling bit information is sent to the switch. However, when a carrier disturbance is detected, the updating process is stopped and the output is controlled by the older stored bits; instead of sending the real-time signaling bit information of each channel to the switch, the signaling bits that were received and stored during a previous frame (e.g., 12 frames earlier) are now coupled to the switch. These (stored) bits will have a much higher probability of being correct since they more than likely preceded the onset of errors (i.e., the carrier disturbance). The stored (same) bits will continue to control the output to the switching machine until framing has been recaptured or the trunks are processed. As the number of stored samples is increased for each channel (i.e., $n = 3$ or 4), the aforementioned probability is increased.

In another embodiment of the invention, three or more signaling bits are stored for each message channel and a majority vote of the stored states determines the output to the switch. This embodiment offers the additional advantage of error "filtering," i.e., the circuit will ignore single bit errors in the signaling bit pattern.

BRIEF DESCRIPTION OF THE DRAWINGS

The invention will be more fully appreciated from the following detailed description when the same is considered in connection with the accompanying drawings in which:

FIG. 2 is a schematic diagram of a preferred embodiment of the present invention;

FIG. 3 is a schematic diagram of another embodiment of the invention;

FIG. 4 is a table which is useful in the explanation of the embodiment of FIG. 3; and FIG. 5 is a schematic diagram of still another embodiment of the invention.

DETAILED DESCRIPTION

Figure 1:
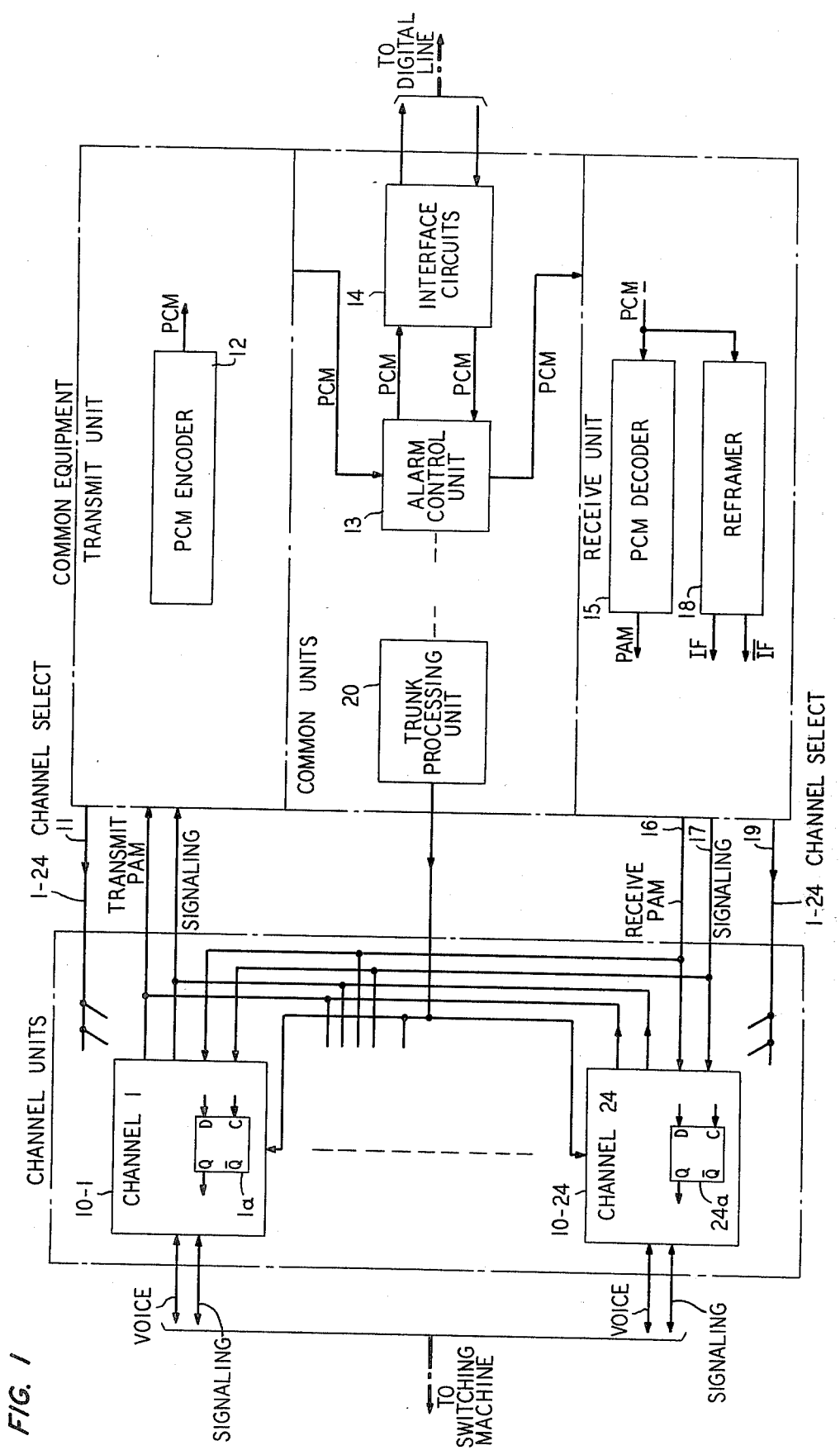
FIG. 1 shows a simplified schematic block diagram of a prior art digital channel bank in which the present invention can be advantageously utilized.

Turning now to FIG. 1 of the drawings, there is shown a schematic block diagram of a digital channel bank which can make advantageous use of the principles of the present invention. For purposes of illustration, the channel bank shown in block form in FIG. 1 is the aforementioned D3 Channel Bank. It is to be understood, however, that the channel bank itself constitutes no part of the present invention and it will be obvious to those in the art that the inventive concepts here disclosed can be used with other and different channel banks or digital terminals — e.g., the aforementioned D2 Channel Bank, the earlier D1 Channel Bank noted in the above-cited articles, or even any later channel banks or other digital terminals that may be developed.

Two general categories of units make up the digital channel bank: common units and channel units. The common units have those functions which are common to all (24) channels and which have characteristics that do not vary with the types of trunks assigned to the channels. Channel units are individual to a particular channel. The channel units 10-1 through 10-24 provide the interface between the voice frequency plant and the common equipment of the digital channel bank. The voice and signaling of a trunk are coupled to a given channel unit over separate wire paths, as shown in FIG. 1, or over the same path depending upon the type of signaling: loop dial pulsing, revertive pulsing, E and M signaling, et cetera.

The voice signal in the transmitting direction, which is continuous in both time and amplitude, is sampled every 125 microseconds (8000 Hz rate) by a time-division gate in the channel unit to develop a pulse amplitude modulation (PAM) signal for the coding circuitry. Each channel's PAM signal is passed through the channel sampling gate at a different time, so that the PAM samples of the 24 channels are interleaved. This is the time-division multiplexing process that makes it possible to convey 24 different signals on one pair of wires. In principle, of course, the PAM pulses could be transmitted in that form. In practice, the PAM pulses are converted into digital codes so that line amplification will be in the form of simple pulse regeneration. The sequential enabling of the channel unit sampling gates is controlled by appropriate signals on the 1-24 channel select bus 11 coupled to each channel unit.

The transmit PAM samples are sent in sequence to the analog portion of the transmit unit. Each sample is held momentarily while the encoder 12 approximates it with an 8-bit digital code word. That is, each PAM sample is encoded into an 8-bit pulse code modulation (PCM) word. After coding, the words are prepared for transmission over a digital line (e.g., a T1 transmission line). Framing and subframing bits are added, and in every sixth frame signaling bits are substituted for the eighth bit of the PCM coded words — i.e., the eighth bit is borrowed for signaling purposes in every sixth frame (see page 230 of the above cited *Record* article for an illustration of frame and signaling formats). The borrowed digit is thus available for signaling more than 1300 times per second, which is adequate to transmit both dial pulses and the supervisory changes of state (off-hook and on-hook). The frame bit pattern enables the receiving channel bank to identify bits belonging to each channel; the subframe bit pattern helps to identify when the signaling frames occur. The composite multiplexed bit stream from the transmit unit is coupled to the digital line via the alarm control unit 13 and interface circuitry 14, of which more will be said later.

In the receiving direction, the converse of the above-described operations is carried out. The incoming digital bit stream from the distant terminal is coupled to the receive unit via the alarm control and interface units 13 and 14. The PCM decoder 15 serves to convert each received PCM code word into a PAM sample, with the PAM samples appearing in sequence on the receive PAM bus 16. The receive unit also serves to extract the signaling bits from the incoming bit stream and deliver the same to the signaling bus 17. The reframer 18 examines the received bit stream for frame synchronization by comparing the framing bits thereof against a locally generated framing pattern. If the comparison is successful, the received digital group is in-frame (IF) and no corrective action need be taken. If the comparison fails, however, an out-of-frame ($\overline{\text{IF}}$) condition is indicated and a "hunting" or reframing procedure is initiated. The IF output of the reframer, of course, indicates normal operation and its converse (IF = 0, $\overline{\text{IF}}$ = 1) is indicative of a carrier disturbance.

Channel selection logic in the channel units 10-1 through 10-24 is sequentially enabled by appropriate signals on the channel select bus 19 to admit the PAM samples into channel unit reconstruction filters. There, the samples are smoothed out so that the original voice signals are closely approximated.

The signaling information received from the far end is delivered to the channel units from the common signaling bus 17. Each channel unit includes a select gate which is enabled, during the appropriate channel time period of a signaling frame, to interrogate the receiving signaling bus. On the basis of the information on the signaling bus 17, the signaling storage flip-flops 1a-24a are set to the appropriate states. This flip-flop store bridges the time between incoming signaling information samples, and operates or releases a relay the contacts of which reproduce the far end signaling condition for use by the near end trunk.

The alarm control unit 13 serves to analyze system performance, and it recognizes trouble or alarm conditions within the channel bank and in response thereto it illuminates alarm lamps and initiates an outgoing alarm. As the name implies, the interface circuitry 14 interfaces the connections to other equipment; for example, the interface circuitry will typically include an equalizer circuit for the equalization of gain and/or delay distortion. The trunk processing unit 20 processes the office trunk circuits if there has been a failure in the system. The trunk processing unit is operated during a carrier failure to condition the trunk leads on the office side of the bank in order to: stop service charges; release established connections; make trunks busy to new calls; prevent false ringing; and, keep noise from the carrier system from reaching office trunk circuits. When the trouble conditions have cleared, the unit is released and all circuits are returned to service. Finally, the channel bank includes a power converter unit (not shown) which converts the office battery supply voltage to the several voltage levels that are used within the bank.

The foregoing brief description of a digital channel bank should provide an adequate background to facilitate an understanding of the present invention and the context in which it is advantageously utilized. Heretofore, when an out-of-frame condition was detected a reframing sequence was started immediately and either a channel busy condition was simulated or the signaling information was left in the last detected state on all channels during the reframing period, depending on whether or not a "make busy" option was used (the D3 Bank uses the "make busy" option). Unfortunately, the first option (make busy) results in the unnecessary seizure of switching equipment, and the second can cause disconnects of customer service when the last detected signaling bit occurred between failure occurrence and detection.

Signaling storage circuitry in accordance with the present invention can be advantageously utilized in the channel units, for example, to overcome the aforementioned disadvantages heretofore encountered in digital channel banks. By way of example, a signaling storage circuit as shown in FIG. 2 of the drawings can be used in each channel unit 10-1 through 10-24 in place of the prior art signal flip-flop store 1a-24a. The signaling bits (S-bits) are clocked (CLK) into the tandem coupled flip-flops 21 and 22 of a channel unit during the appropriate channel time period of a signaling frame in much the same manner as heretofore described. With the system operating normally (IF = 1), each incoming real-time S-bit is clocked into the flip-flop 21 and the preceding S-bit (e.g., the one occurring 12 or more frames earlier in time) is simultaneously transferred from flip-flop 21 to flip-flop 22. For purposes of illustration, FIG. 2 shows only two tandem coupled flip-flops, but it will be appreciated by those in the art that three or more flip-flops could just as readily have been connected in tandem.

Under normal working conditions (IF = 1) the output (RD) to the relay, which restores the far end signaling condition to the near end trunk, is directly influenced by the incoming real-time samples. That is, the AND gate 23 is coupled to the output of flip-flop 21 and couples said output to the relay via the OR gate 24. However, when a carrier disturbance (i.e., out-of-frame condition) is detected, the updating process is stopped — i.e., IF = 0, the AND gate 25 is disabled and no new S-bit samples will be clocked into the flip-flops. The output (RD) to the switching machine is thence controlled by the older stored bit. Thus, instead of sending the real-time S-bit of the channel (in flip-flop 21) to the switch, the S-bit that was received and stored (in flip-flop 22) during a previous signaling frame is now coupled to the output. To this end, the AND gate 26 is now enabled ($\overline{IF}$ = 1) and the older S-bit in flip-flop 22 is coupled to the output. The older (same) bit stored in flip-flop 22 will continue to control the output to the switching machine until framing has been recaptured or unitl the trunks are processed. Once framing has been recaptured (IF = 1), the newly arrived S-bits will be clocked into the flip-flops 21 and 22, as heretofore described, and the output to the switching machine will, once again, be derived from the flip-flop 21.

As will be appreciated by those in the art, there are a number of flip-flop circuits that can be used to advantage in the circuitry of the present invention. For example, the flip-flop 21 may comprise a conventional latch-type flip-flop and flip-flop 22 may comprise the ubiquitous "D" type flip-flop manufactured by Western Electric Co., Texas Instruments, Inc. and others.

Turning now to the embodiment of the invention shown in FIG. 3, three (or more) flip-flops 31-33 are coupled in tandem, as before, and hence three (or more) of the most recent signaling bits are stored for each message channel. The output of the flip-flops 31-33 are coupled to a majority voting circuit and a majority of the stored S-bits determines the output (RD). As previously pointed out, this circuit offers the advantage of error "filtering."

For purposes of illustration, only three tandem coupled flip-flops are shown in FIG. 3, but it should be clear to those in the art that the invention could include more than three flip-flops with appropriate majority vote logic. For example, a majority vote of three out of four of the most recent S-bits can be readily implemented. The circuit shown in FIG. 3 makes use of NAND logic merely for the purpose of demonstrating that the invention in no way relies on the particular type logic used for its implementation.

The signaling bits (S-bits) are clocked into the tandem coupled flip-flops 31, 32 and 33 of a channel unit as heretofore described. With the system operating normally (IF = 1), each incoming S-bit is clocked into the flip-flop 31 and the preceding S-bits are simultaneously transferred to the other tandem coupled flip-flops. However, as before, when a carrier disturbance is detected, the updating process is stopped — i.e., IF = 0, the NAND gate 35 is disabled and no new S-bit samples will be clocked into the flip-flops.

The table of FIG. 4 depicts the operation of the majority vote logic 36–39 of FIG. 3. If all the stored S-bits are "0," the RD output is "0," if two of the stored S-bits are "0," the RD output is still "0;" if two of the stored S-bits are "1," the RD output is "1;" and, if all the stored S-bits are "1," the RD output is "1." Hence, the designation of this logic circuit as a majority vote circuit. The Boolean expression for the circuit operation is:

$$RD = Q_1 \cdot Q_2 + Q_1 \cdot Q_3 + Q_2 \cdot Q_3$$

In the embodiment shown in FIG. 5, three (or possibly more) flip-flops 51-53 are coupled in tandem, as before, and hence three (or more) of the most recent signaling bits are stored for each message channel. The S-bits are clocked into the tandem coupled flip-flops 51-53 as previously described. With the system operating normally (IF = 1), each incoming S-bit is clocked into the flip-flop 51 and the preceding S-bits are simultaneously transferred to the other tandem coupled flip-flops. However, as before, when a carrier disturbance is detected, the updating process is stopped — i.e., IF − 0, the AND gate 54 is disabled and no new S-bit samples will be clocked into the storage flip-flops until the system returns to normal. It should be noted that in this embodiment the steering of FIG. 2 is deleted and the output (RD) is always derived from the last of the tandem coupled flip-flops. This embodiment can find use in those cases where it is relatively unimportant that the very most recent S-bit be coupled to the output relay.

While a much higher probability of correct stored signaling bits can be achieved in accordance with the invention by storing additional signaling bits, a larger number of stored signaling bits not only means more memory space but also a higher risk of the stored signaling bits being obsolete. This means that the number of stored signaling bits should be as small as possible, but at the same time, must be sufficient for the stored signaling bits to be correct. For most cases, the storage of from two to four S-bits per message channel should prove quite satisfactory.

As described herein, the signaling storage function was assigned to the channel units. However, it should be clear to those in the art, that the signaling storage function might be carried out totally within the common receive unit of the channel bank. The storage function, of course, would be the same as that described. To store signaling information in the common equipment portion of a digital terminal is illustrated, for example, in U.S. Pat. No. 3,970,799, issued July 20, 1976 to J. R. Colton et al.

The above examples are believed adequate to provide a proper understanding of the principles of the present invention. It will be obvious that various permutations or modifications thereof may be made without departing from the spirit and scope of the invention. For example, the normal (IF) AND gate steering of the real-time S-bits to the output, as illustrated in FIG. 2, might readily be combined with the majority vote feature of FIG. 3 when a carrier disturbance (IF) is detected.

Thus, while the present invention has been described by reference to particular embodiments thereof, it will be understood that numerous modifications may be made by those skilled in the art without departing from the spirit and scope of the invention.

What is claimed is:

1. A digital channel bank wherein a plurality of incoming digital messages is received in separate time division multiplexed channels and signaling information bits for each channel are disposed at predetermined positions in the incoming digital message bit stream, the signaling bits being separated out from the incoming bit stream in the channel bank; said digital channel bank being characterized by a signaling storage circuit for each channel comprising means for storing two or more of the most recent signaling information bits of the channel, means for continually updating the stored signaling bits, means for stopping said updating when a carrier disturbance is detected in the incoming digital message bit stream, and means for deriving an output signal in accordance with an older stored signaling bit when a disturbance is detected.

2. In a digital transmission terminal which receives a plurality of incoming digital messages in separate time division multiplexed channels and signaling information bits for each channel at predetermined positions in the incoming digital message bit stream, the signaling bits being separated from said digital messages at said terminal, a signaling storage circuit for each channel characterized by means for storing at least two of the most recent signaling information bits of the channel, means for continually updating the stored signaling bits, means for normally deriving an output signal in accordance with the most recent stored signaling bit, means for stopping said updating when a disturbance is detected in the incoming digital message bit stream, and means for deriving said output signal in accordance with the older stored signaling bit when said disturbance is detected.

3. A signaling storage circuit as defined in claim 2 wherein the storing means comprises a pair of tandem coupled flip-flops, the most recent signaling information bit of the channel being deposited into the first of said tandem coupled flip-flops and the preceding signaling information bit being simultaneously transferred to the second of the tandem coupled flip-flops.

4. In a digital transmission terminal as defined in claim 2 which is made up of common equipment units and channel units that are individual to each message channel, a signaling storage circuit as defined being respectively incorporated into each channel unit.

5. In a digital circuit channel bank which receives a plurality of incoming digital messages in separate time division multiplexed channels and signaling information bits for each channel at predetermined positions in the incoming digital message bit stream, the signaling bits being separated out from the incoming digital message bit stream; a signaling storage circuit for each channel characterized by means for storing at least three of the most recent signaling information bits of the channel, means for continually updating the stored signaling bits, means for stopping said updating when a carrier disturbance is detected in the incoming digital message bit stream, and means for deriving an output signal in accordance with the majority of the stored signaling bits.

6. A signaling storage circuit as defined in claim 5 wherein the storing means comprises three tandem coupled flip-flops.

* * * * *